Dec. 9, 1958    B. P. ALLERSMA    2,863,669
VEHICLE PROVIDED WITH ROTARY DISTRIBUTING DEVICE
Filed Dec. 20, 1954    2 Sheets-Sheet 2
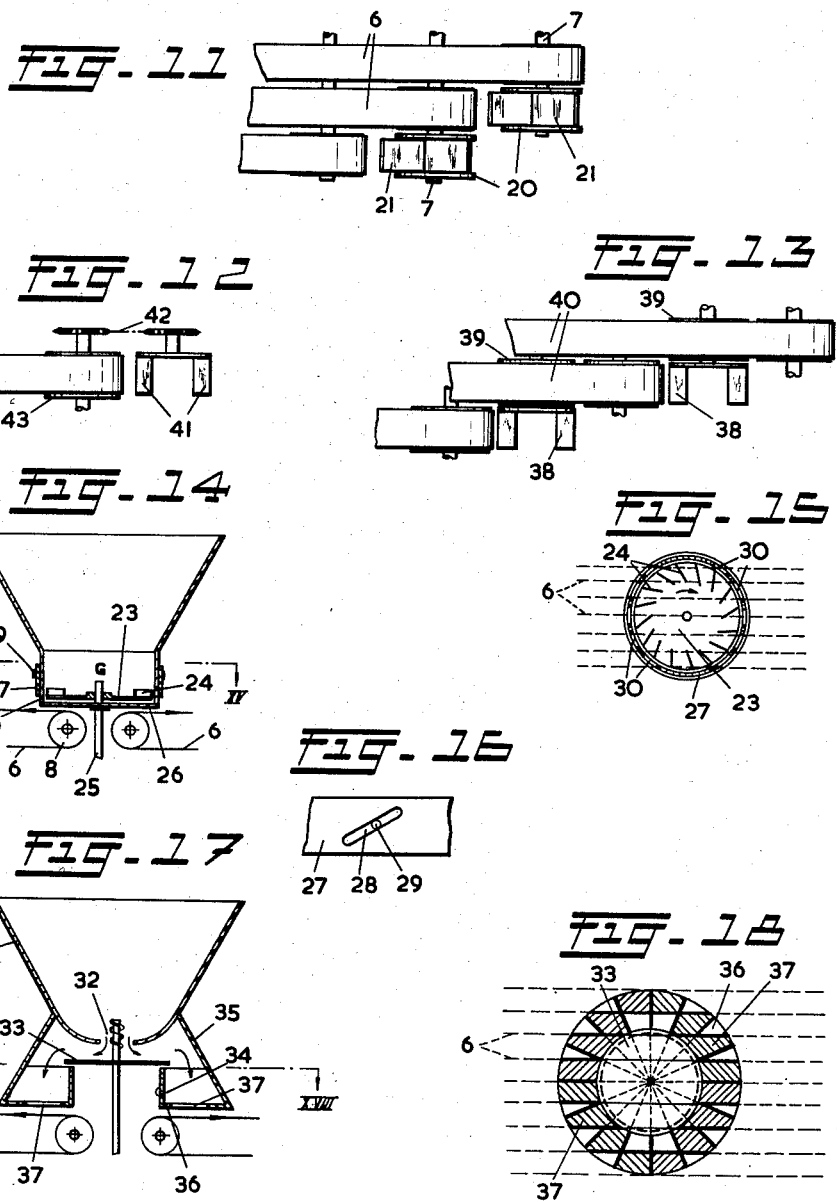
INVENTOR.
BARTELD PIETER ALLERSMA
BY
Young, Emery & Thompson
Attys.

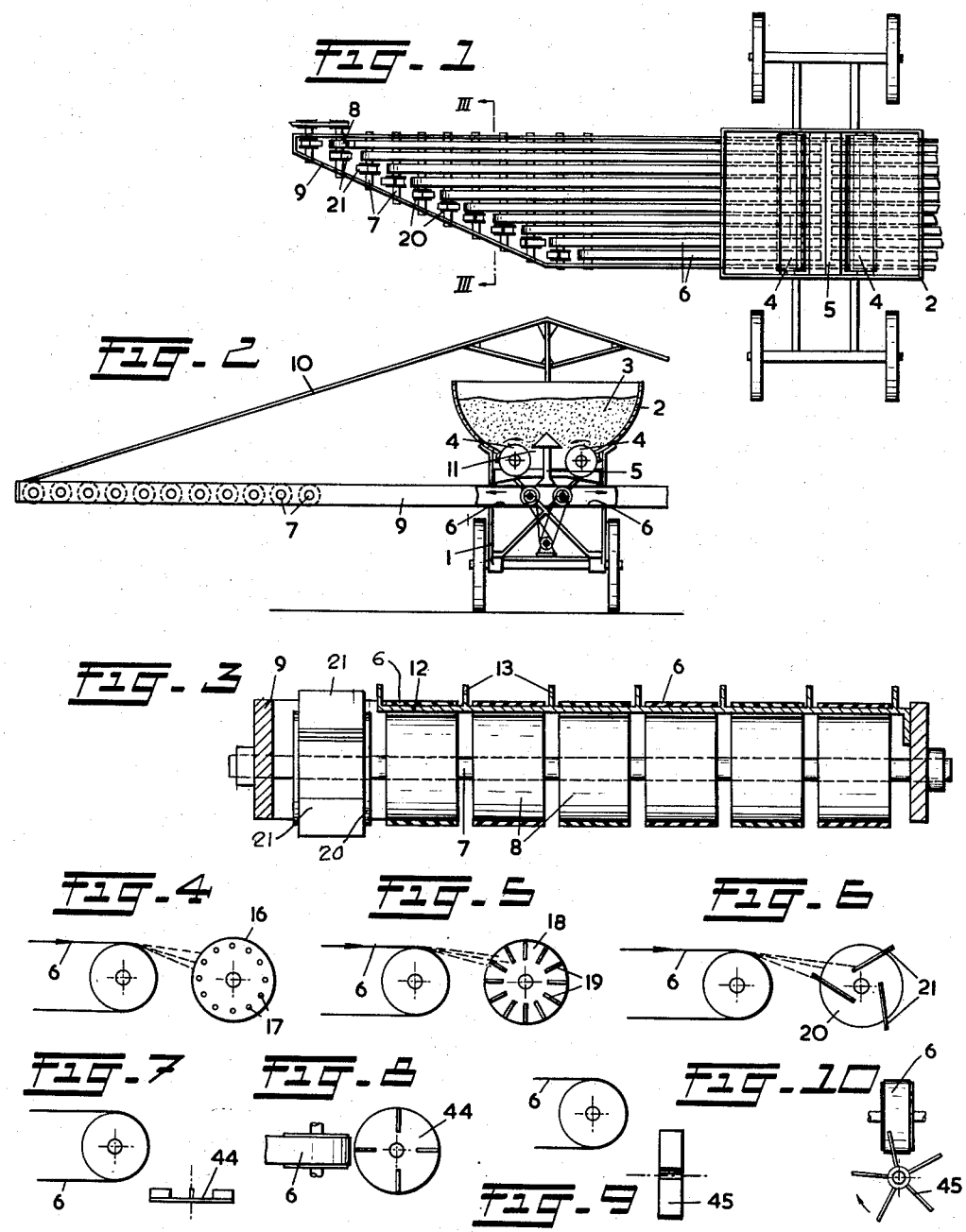

United States Patent Office 2,863,669
Patented Dec. 9, 1958

2,863,669

VEHICLE PROVIDED WITH ROTARY DISTRIBUTING DEVICE

Barteld Pieter Allersma, Den Andel, Netherlands

Application December 20, 1954, Serial No. 476,515

2 Claims. (Cl. 275—2)

The present invention relates to a vehicle provided with a distributing device for powdered or granulated materials arranged below the discharge opening of a container and extending across the vehicle, which distributing device comprises a plurality of distributing members of mutually different distributing ranges, which members are disposed one after another in the direction of travel of the vehicle.

In this known machine the materials to be distributed are freely thrown off the conveyor belts, so that it is not or hardly possible to control the spreading or the concentration of said materials.

The object of this invention is to improve said known vehicle which renders it possible either to spread the materials to a greater extent or to concentrate them to a greater extent.

According to the invention this is achieved in that opposite the discharge end of each distributing member one or more rotatable deflecting means are provided.

According to the invention said deflecting means may be formed by pin or blade wheels. The blades of said blade wheels may be arranged according to an entire, partial or extended chord line of the periphery of the wheel. The pin or blade wheels may be so positioned according to the invention that the direction of their shafts is vertical. The direction of said shafts may also be parallel to the direction of feed of the distributing members. In case the distributing members consist of endless conveyor belts the deflecting means may each be drivingly coupled with the end roller of the associated conveyor belt.

According to another embodiment the deflecting means may in said case each be drivingly coupled with an adjacent conveyor belt. According to another feature of the invention a deflecting means belonging to a certain conveyor belt may be provided on the end roller or endshaft of a conveyor belt of larger reach.

The invention furthermore relates to a vehicle of the type indicated in which in addition use is made of a container provided with a hurling disc, said container being provided with discharge openings, whose place, location and shape corresponds with the distributing members. If the openings are provided in the side walls of the container it is possible according to the invention for said openings to be at least partly closable by an adjusting ring. According to the invention the container may be divided into compartments corresponding with the distributing members. According to the invention said compartments may have a bottom provided with openings arranged according to the pattern which in plan view is formed by the lines of intersection of the vertical planes confining said compartments and the parallel planes confining the distributing members. Finally the distributing members according to the invention may consist of endless belts that are trough-shaped in cross-section.

The invention is further elucidated with reference to the accompanying drawings, which show a number of embodiments.

In these drawings:

Fig. 1 is a partial, diagrammatic plan view of the new device,

Fig. 2 is a corresponding rear view,

Fig. 3 is an enlarged vertical section according to the line III—III in Fig. 1 and Figs. 4–10 inclusive show various embodiments of the deflecting means.

Figs. 11–13 inclusive show how the deflecting means can be driven in various manners.

Figs. 14 and 15 show a vertical and a horizontal section respectively, of a container with a hurling disc and dosing openings.

Fig. 16 is a partial view of a closing element for the openings in the container according to Fig. 14.

Figs. 17 and 18 show a vertical and a horizontal section respectively of a container provided with a hurling disc and dosing faces.

The reference numeral 1 designates the vehicle provided with a container 2 for the fertilizer 3 to be distributed.

This container comprises a rotor 4 on either side of a partition 5 for facilitating the discharge (see Fig. 2).

A number of endless belts 6 is located below the discharge openings 11. The embodiment shown is symmetrical, so that the belts extend to either side.

The belts mutually differ in length, so that in accordance with the relative lengths of the belts the fertilizer is distributed.

The belts which may be driven in any suitable manner, rotate about shafts 7 carrying rollers 8 which are carried by a frame 9, which in turn is supported by tie rods or cables 10.

Plates 12 provided with partition ridges 13 are located below the upper runs of the belts.

The discharge openings 11 extend to beyond the shortest belts 6 (Figure 1), so that the fertilizer will also be distributed in the middle, which fertilizer therefore directly drops to the ground.

The ridges 13 impart a greater firmness to the plate 12 and prevent the fertilizer from passing from the one belt to the other, which might happen under the influence of wind, slopes or shocks.

The distributing device is adapted to be mounted on an ordinary platform cart or on the platform of a truck. The device should be located then so far towards the rear of the vehicle that the belts which are shorter than half the width of the platform clear said platform.

The upper side of each wing may be screened from wind by means of a plate.

The apparatus may simply be put partially out of operation by closing part of the container so that a portion of the belts will not receive any fertilizer then.

Fig. 4 shows a deflecting means consisting of a wheel 16 provided with pins 17, while Figure 5 shows a deflecting means consisting of a wheel 18 provided with blades 19. The blade wheel 20 according to Figure 6 comprises blades 21 arranged according to chord lines.

Figs. 7 and 8 show a blade wheel 44 whose shaft is directed vertically. This has for its result that the material to be distributed is hurled away according to horizontal planes.

Another arrangement of the blade wheel is shown in Figs. 9 and 10. In this case the shaft of the blade wheel 45 is horizontal and parallel to the direction of feed of the distributing device consisting of a conveyor belt. The blade therefore move in a direction lateral to the direction in which the material is thrown off the belt.

The pin or blade wheels may be driven in various manners. Fig. 11 shows the case in which each pin or blade wheel is firmly secured on the shaft of the end roller belonging to the adjacent farther reaching conveyor belt. In the embodiment according to Fig. 12 each pin or blade wheel 41 is driven via a rope 42 by the end roller 43 of the associated conveyor belt.

Fig. 13 shows another embodiment, in which each pin or blade wheel 38 is driven via a disc 39 located within the adjacent conveyor belt 40. The disc 39 therefore is contacted at the upper and at the lower side and driven by the upper and lower run of the belt 40, said belt being at the same time supported by the disc 39.

In the container 22 shown in Figure 14 a rotating hurling disc 23 comprising blades 24 is used, the shaft 25 of which disc extends through the bottom 26. The cylindrical portion of the container is surrounded by a ring 27 which is rotatable and which has its oblique slots 28 (See Fig. 16) guided by pins 29.

By turning the ring the latter will be moved upwards or downwards and thus the discharge openings 30 (See Fig. 15) will be controlled.

The container 31 shown in Figures 17 and 18 has a central discharge opening 32 in its bottom, through which the fertilizer drops onto the hurling disc 33. Said disc hurls the materials into compartments 34 which are provided within the conical wall 35. In the bottoms 36 of said compartments openings 37 are provided, which are arranged according to a pattern which (See Fig. 18) is formed by the lines of intersection of the radial planes confining the compartments and the parallel planes confining the conveyor belts 6.

I claim:

1. In a vehicle provided with a distributing device for powdered or granulated materials arranged below the discharge opening of a container and extending across the vehicle and comprising support means, a plurality of pulley shafts carried thereon, belts and pulleys carried by said shafts, said belts being disposed one after another in the direction of travel of the vehicle and having their inner pulleys generally in line and their outer pulleys in stepped relation whereby to provide belts of mutually different distributing ranges, means to rotate the pulleys at the inner ends of said belts for causing movement thereof, a deflecting device for the discharge end of each distributing belt comprising a vertically disposed blade wheel and a plurality of blades arranged thereon and rotating with the wheel, the axis of one belt outer pulley being in line with the axis of the next adjacent blade wheel, and means operatively connected to the outer pulley of one belt and to the blade wheel of the adjacent belt to drive said blade wheel.

2. The device of claim 1, said last-mentioned means comprising a common shaft extending from said pulley to said wheel.

References Cited in the file of this patent

UNITED STATES PATENTS

| 1,170,673 | Rice | Feb. 8, 1916 |
| 1,389,518 | Leminger | Aug. 30, 1921 |
| 1,915,927 | Goodman | June 27, 1933 |
| 2,647,756 | Allersma | Aug. 4, 1953 |
| 2,665,135 | Harper | Jan. 5, 1954 |

FOREIGN PATENTS

| 42,446 | France | May 2, 1933 |